United States Patent [19]
Landes et al.

[11] Patent Number: 5,233,685
[45] Date of Patent: Aug. 3, 1993

[54] METHOD AND APPARATUS FOR INTEGRATED GRAPHICAL AND TEXTUAL CHARACTER PRINTING

[75] Inventors: Alan Landes; Stuart D. Jensen, both of Orem; David Atkinson, Provo, all of Utah

[73] Assignee: WordPerfect Corporation, Orem, Utah

[21] Appl. No.: 536,972

[22] Filed: Jun. 12, 1990

[51] Int. Cl.$^5$ .............................................. G06F 15/62
[52] U.S. Cl. ................................. 395/147; 395/145; 395/151
[58] Field of Search ................. 395/144, 153, 106–110, 395/145–148, 150, 151, 112; 364/419

[56] References Cited

U.S. PATENT DOCUMENTS

| | | | |
|---|---|---|---|
| 4,594,674 | 6/1986 | Boulia et al. | 395/147 X |
| 4,901,249 | 2/1990 | Shiota | 395/110 X |
| 4,933,880 | 6/1990 | Borgendale et al. | 395/147 |
| 5,007,002 | 4/1991 | Imaizumi et al. | 395/110 |

Primary Examiner—Gary V. Harkcom
Assistant Examiner—Almis Jankus
Attorney, Agent, or Firm—Weil, Gotshal & Manges

[57] ABSTRACT

A method and apparatus for utilizing a digital computer to print characters of multiple fonts, both textually and graphically, on a single printer from within a single document [is disclosed]. Existing computer programs provide the capability of printing pre-defined textual characters or graphical characters separately, but not in an integrated manner as is disclosed. Thus, the invention enables printing of a variety of mixed characters, such as international alphabetic characters and complex mathematical characters, within a single document.

9 Claims, 4 Drawing Sheets

METHOD AND APPARATUS FOR INTEGRATED GRAPHICAL AND TEXTUAL CHARACTER PRINTING

BACKGROUND OF THE INVENTION

1. The Field of the Invention

"Wordprocessing" involves the use of a digital computer and a computer program running on the computer to manipulate printed characters in creating and editing printed documents. These documents can be displayed electronically on a computer display screen or printed on hardcopy. This document was created using a wordprocessing program ("wordprocessor"), WordPerfect 5.1. Manipulation of data in the form of printed characters is, indeed, a fundamental tool for human interaction with computers. Input devices such as keyboards provide the mechanism for feeding information to the computer, while output devices, such as video display terminals and printers, provide the mechanisms for viewing the results. Wordprocessors are a fundamental and vital tool of modern business.

Wordprocessors range in functionality from simple "text editors," which do no more than reproduce on the display screen the user's keyboard input, to sophisticated "desktop publishers," which enable the user to create, display, and print sophisticated, publication quality documents. Computer programs for wordprocessing have been in existence for many years. Only recently, however, have highly sophisticated wordprocessors become available for microcomputers such as IBM Personal Computers and compatible computers ("IBM PC's and compatibles").

Characters may be printed in various shapes and sizes. The appearance of characters on a printed page or display screen is referred to as its "font." Typically, a particular font consists of a character set of a distinct style containing the letters of the alphabet, numbers, and other frequently used symbols. A font is characterized by three elements: typeface (the style of the character, e.g., Times Roman or Courier), weight (e.g., bold or italic), and point size (the size of the font—one point being approximately 1/72"). Until recently, only a few standard fonts were available through wordprocessors running on microcomputers. Sophisticated, non-standard fonts typically had to be typeset by commercial printing organizations. In recent years, however, a large assortment of fonts have become available to microcomputer users through the use of wordprocessors.

Printers designed for use with microcomputers typically print characters in either of two modes: text or graphic. In order to print in text mode, a character must be pre-defined in the printer's memory. Thus, when printing in text mode, the printer receives data from the computer telling it what character to print and exactly where on the page to print it but not a definition of how to print it. The printer retrieves the definition of the character from its memory which then directs the printer's printing mechanism how to print the character. If that particular character is not defined in the printer's memory, however, it must be printed in graphics mode if it can be printed at all. In graphics mode, data is sent directly from the computer to the printer's printing mechanism telling it precisely how to print a character. Thus, the essential difference between text and graphics mode printing is the source of the data defining the character, with text mode data residing in the printer's memory and graphics mode data being supplied directly from the attached computer. Graphics mode printing obviously allows much greater flexibility in character style. It also can be much more time consuming due to the increased volume of data that must be sent from the computer to the printer.

Fonts that are printable in text mode are defined as either "hard fonts" or "soft fonts." Hard fonts consist of pre-defined font data that is stored in the printer's permanent, or "read only," memory ("ROM"), or on printer cartridges, which are data storage mechanisms that can be read directly by the printer. Soft fonts consist of data that is downloaded (transferred electronically) from the computer to the printer's temporary, or "random access," memory ("RAM") where it is stored until the printer is turned off or instructed to erase its memory. Most wordprocessors enable the user to print characters in text mode using either hard fonts or soft fonts. However, these wordprocessors are still limited in their font selection to fonts printable in text mode, i.e., hard fonts or soft fonts. The invention disclosed herein overcomes this limitation in font selection.

2. The Prior Art

In the early years of personal computing, only a small number of fonts were available for use with wordprocessors. Likewise, only a few types of printers were available for printing these fonts. Consequently, wordprocessing documents tended to be printer dependent in that they used a limited selection of fonts which were largely determined by the font capability of the attached printer. Today, however, hundreds of printers with diverse font printing capabilities are marketed for use with personal computers. Likewise, new fonts are increasingly available and easier to incorporate into wordprocessing documents. These new fonts may be utilized in varying combinations within wordprocessing documents. However, since a printer is capable of printing only a subset of all available fonts in text mode, if a document contains characters of a font that the printer is not capable of printing, they will not be printed.

The disclosed invention solves this problem, thereby allowing greater printer independence in wordprocessing documents. Specifically, many fonts which could not be used and printed in the same document prior to this invention can now be printed in the same document. Whereas the types of fonts that could be included in a document once were determined by the capability of the printer, the invention allows one to include a greater variety of fonts, including international and mathematical characters, independent of what the printer is capable of printing in text mode. Thus, a document may be created with multiple fonts and printed on different printers, regardless of whether each printer is capable of printing each font in the document in text mode.

Thus, the method and apparatus disclosed herein enable the user to print characters in both text mode and graphics mode from the same document in a manner that is transparent to the user, i.e., the user need not know which fonts require graphics mode and which do not. The invention enables such document to be printed using any printer that has a graphics mode, whether or not the printer is capable of printing the fonts in the document in text mode. Characters that cannot be printed in text mode will automatically be printed in graphics mode.

SUMMARY OF THE INVENTION

It is the object of this invention to provide an integrated graphical and textual printing process and apparatus which permit a user of a wordprocessor, with little or no understanding of the mechanisms and techniques by which wordprocessors and printers combine to create and print documents, to print documents containing a combination of characters, some of which can be printed in text mode and others of which must be printed in graphics mode. Thus, it is also the object of this invention to enable wordprocessor users to create documents with a large variety of fonts, character styles and character sizes and to print those documents on a single printer without concern for whether all of the characters in each document can be printed in text mode by that printer.

In a wordprocessing system using the present invention, after a document has been created, it is printed by sending it, character by character, by electronic means to the printer. Before each character is sent to the printer, it is first determined by the computer system whether the character can be printed in text mode. If it can, then a code representing the character is sent to the printer and it is printed using the printer's stored definition for the character. If the entire character cannot be printed in text mode, it is determined whether the character can be split into two characters, a base and a diacritical. If it can, and each of the base and diacritical character can separately be printed in text mode, the base character is printed and overstruck by the diacritical. If only the base character can be printed in text mode, it is printed and overstruck by the diacritical which is printed in graphics mode. Otherwise, either a substitute character is printed or the character is printed in graphics mode as follows.

If a list of substitute fonts has been preselected for the font in which the character cannot be printed in text mode, the list is searched in priority of selection for the same character in a font that can be printed in text mode. If a substitute font list has not been selected or if the original character is not "mapped" in a substitute font (i.e., a character is "mapped" if it can be printed in text mode on the selected printer), then the "primary substitute character table" is consulted to determine whether an equivalent character exists in the original font or a list of substitute fonts that is supported in text mode by the printer being used. If so, that character is printed in text mode.

If no substitute character that can be printed in text mode is found and the printer does not support graphics mode, then a secondary substitute character table is consulted to determine whether a substitute character can be printed in text mode. If not, a blank space is printed.

If the printer supports graphics mode, the character is printed in graphics mode. Unlike text mode, in which the computer sends only a code directing the printer which character to print using character data definitions in the printer's memory, characters are printed in graphics mode by sending from the computer to the printer data which completely defines the character including not only its font and size, but also its exact position on the page. Character data is stored in a file called the Display Resource File ("DRS File"). Any character with a definition in the DRS File may be printed in graphics mode. Thus, the number of graphics characters that may be printed is limited only by the character data contained in the DRS File.

DESCRIPTION OF AN ILLUSTRATIVE EMBODIMENT

While the illustrative embodiment is being generally described, the present invention is actually embodied in the WordPerfect version 5.1 wordprocessor currently being marketed by the assignee of the present invention for IBM PC's and compatibles using the MS-DOS operating system.

Figure 1:
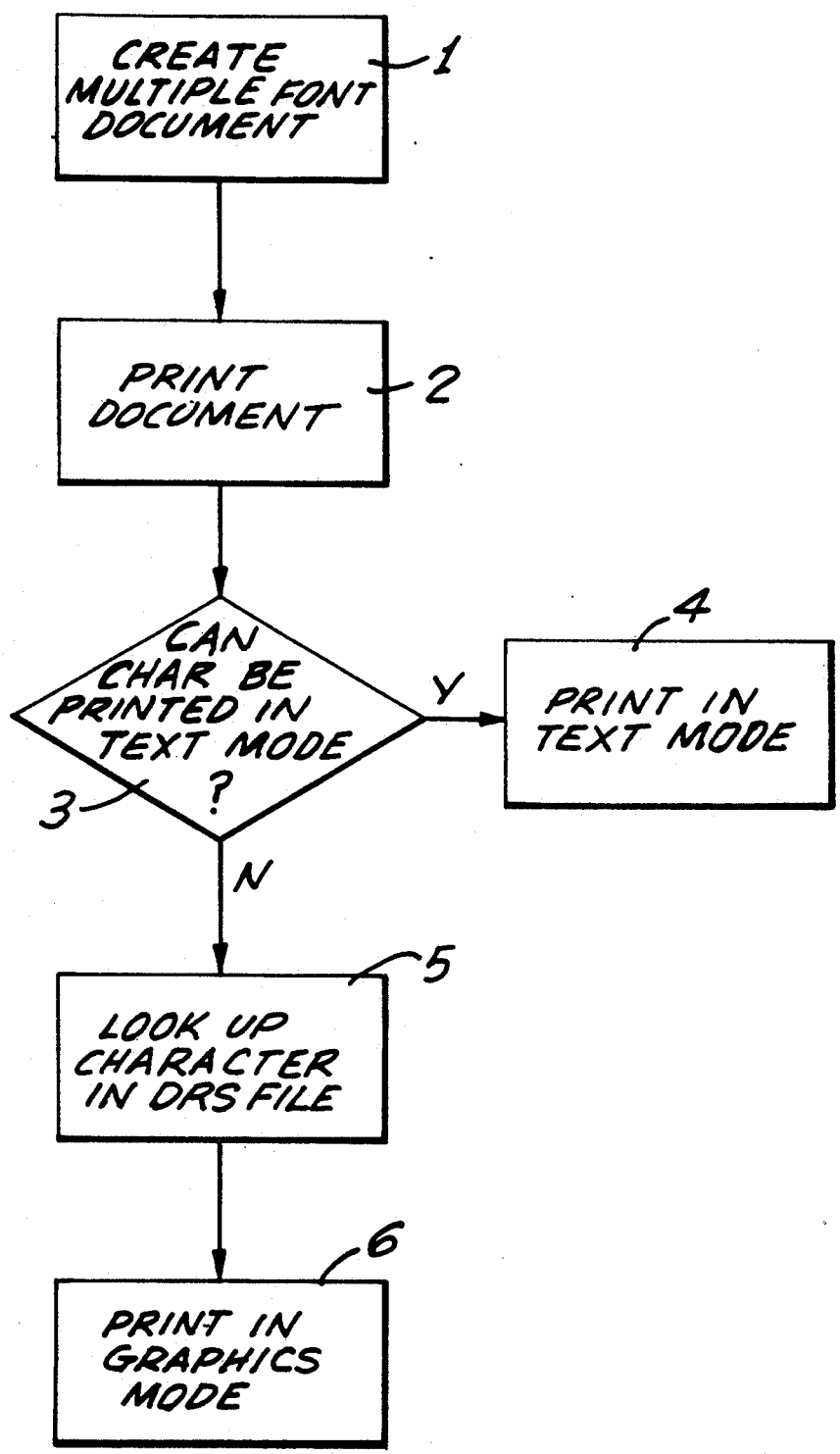
FIG. 1 is a flow chart which describes generally the printing of integrated graphical and textual characters according to the invention.

FIG. 1 contains an overview of the invention in block diagram form. Referring to FIG. 1, a document is created using a wordprocessor 1. The characters used in the document may be of one or more font types. When the document is printed 2, for each character in the document it is determined whether the character is supported in text mode by the printer being used 3, i.e., whether the character is defined as part of a hard font or a soft font stored in the printer's memory. If the character is supported in text mode, it is printed as such 4, otherwise graphics data defining the character stored in the DRS file 5 is sent from the computer to the printer and it is printed in graphics mode 6.

Figure 2A:
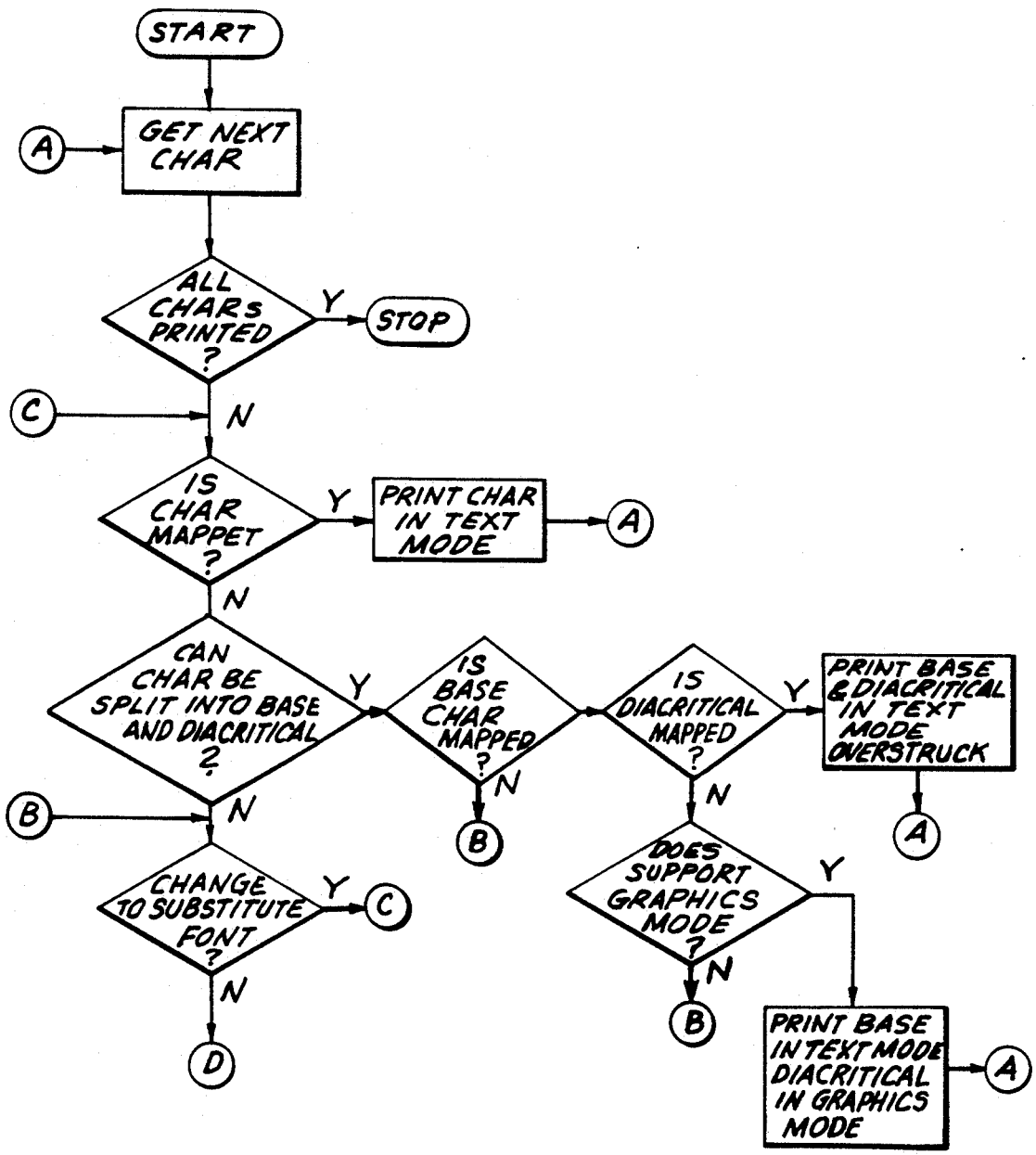
FIGS. 2(a)-2(b) are flow charts which describes in greater detail integrated graphical and textual character printing according to the invention.
Figure 2B:
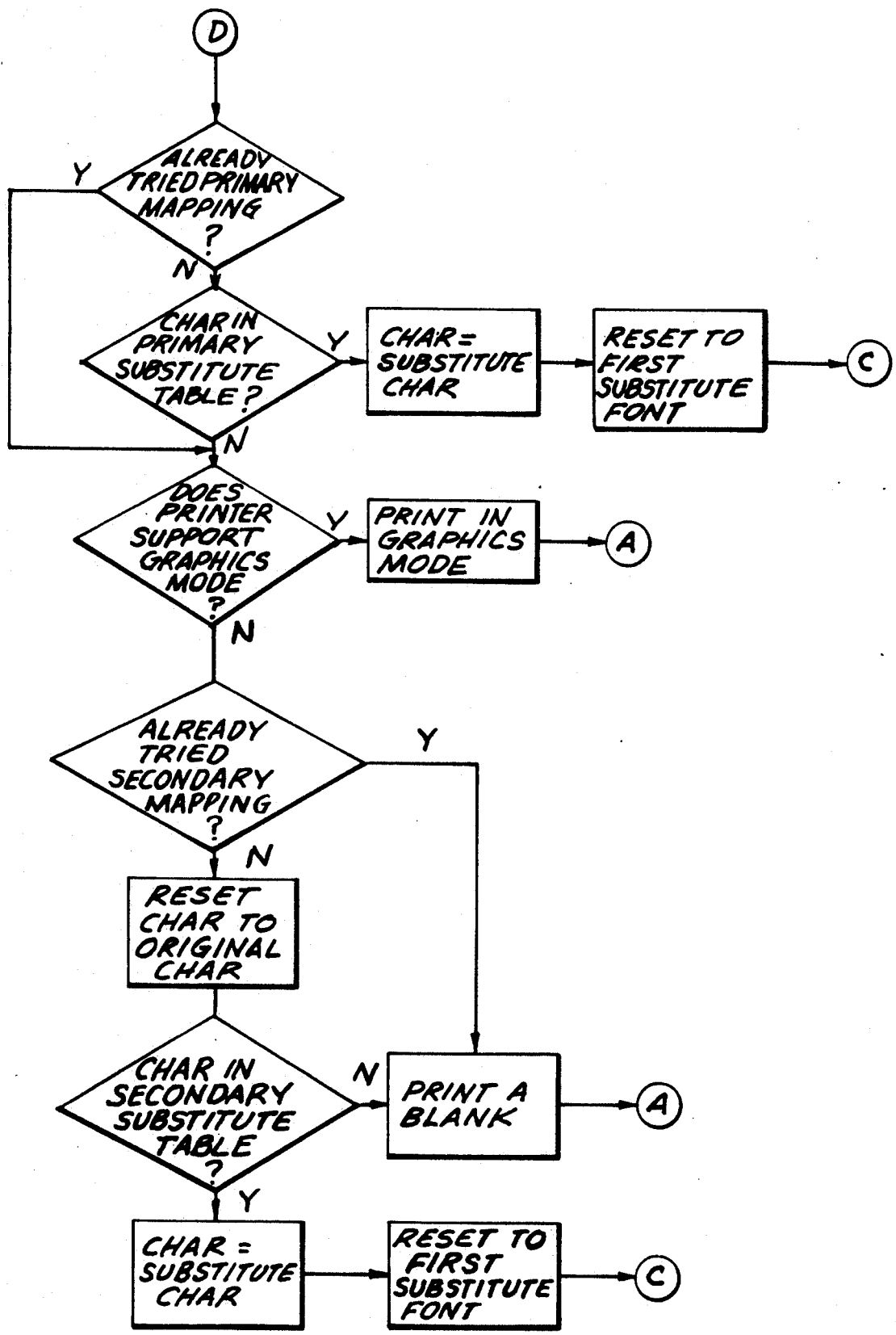

Referring to FIG. 2, the process is described in greater detail. When a document is printed, it is first determined for each character in the document whether it can be printed in text mode on the printer being used. For each printer, a table of characters and fonts supported by that printer in text mode is stored in a Printer Resource file ("PRS file"). A character that is supported by the printer is "mapped" in a PRS file. In the preferred embodiment, a PRS file is stored in storage means such as a 5¼" magnetic disk and contains character and font data relating to character sizing that is well known in font technology. If the character and font is found to exist in the PRS file for the printer being used, it is immediately printed in text mode. A character is printed in text mode by simply sending a code representing the character, such as its ASCII code, and its font to the printer through a communication link with the printer. The printer will then print the character using the definition of the character stored in printer memory.

If the character cannot be printed in text mode (i.e., it does not exist in the PRS file), the method next determines whether the character can be split into a "diacritical" and a "base" character. In the character "é," for example, the "e" is the base character and the " ´ " is the diacritical. Other examples of characters that can be split into base and diacritical characters are ä, a, l, , s̄, and Å. A list of such characters is maintained by the program. If the character can be split, the method next determines whether the base character is mapped in the PRS file. If the base character is mapped, it is next determined whether the diacritical character is mapped in the PRS file. If it is, then the base character and the diacritical character are printed separately in text mode by overstriking the diacritical character on the base character. If the diacritical is not mapped in the PRS file, then it is determined whether the printer being used supports graphics mode. If the printer is capable of printing in graphics mode, then the diacritical is printed in graphics mode by overstriking it on the base character after the base character has been printed in text mode.

If the character cannot be printed in text mode or as a base and a diacritical as described above, it is first determined whether to use a substitute font. The user is provided the option to pre-select substitute fonts, which selections are stored in a file on a disk so they may be accessed when necessary. Since printers have differing font capabilities, users have the option to pre-select similar substitute fonts that will automatically be printed for all characters of the chosen font if it cannot be printed in text mode from the currently selected font on the printer being used. If a substitute font is used, then the process described in the preceding paragraph is repeated for the substitute font, i.e., it is determined whether the same character in the substitute font can be printed on the chosen printer in text mode. Otherwise, a "primary substitute character table" is consulted to determine whether a similar character can be printed from the current font or the list of substitute fonts.

The primary substitute character table maps each of a subset of characters in the chosen font to another similar character within the same font. It is used when the printer cannot print the character in text mode in the current list of substitute fonts but does support a similar character in the current font. The characters mapped in the primary substitute character table are close enough matches to the intended characters that they are considered a better alternative than printing the character graphically. If a similar or alternate character is mapped in the primary substitute character table for the current font, the process described in the preceding paragraph is repeated for the alternate character, i.e., it is determined whether the alternate character is mapped in the PRS file and, if so, it is printed in text mode. Otherwise, if the printer supports graphics mode, the character is printed in graphics mode.

The preferred embodiment of the invention as described herein, including the primary substitute character table, exists in the WordPerfect 5.1 wordprocessor for IBM PC's and compatibles of WordPerfect Corporation. Each character available in the WordPerfect character sets is identified by a pair of numbers, such as 3,48, where the first number indicates a character set and the second number indicates the number of the character within the set. The primary substitute character table is structured into double word entries where the first word contains the character number of the character from which the mapping is occurring, and the second word contains the character number to which the first word entry maps.

TABLE I contains an extract from a primary substitute character table as implemented in the preferred embodiment:

TABLE I

| primary_table label | byte |
| --- | --- |
| db 48,3,8,3 | ;char 3,48 is mapped to char 3,8 |
| db 49,3,9,3 | ;char 3,49 is mapped to char 3,9 |
| db 50,3,8,3 | ;char 3,50 is mapped to char 3,8 |
| db 51,3,9,3 | ;char 3,51 is mapped to char 3,9 |

TABLE I-continued

| primary_table label | byte |
| --- | --- |
| db 52,3,19,3 | ;char 3,52 is mapped to char 3,19 |

In the event that no alternate character is found and the printer does not support graphics mode, the "secondary substitute character table" is consulted. The secondary substituted character table maps characters of last resort in that they are not considered as good a match for the intended character as printing it graphically would be but are better than printing a blank space for the character. The secondary substitute character table maps each of a subset of characters in the current fonts to a similar character in the current font or a similar character in the list of substitute fonts that is supported in text mode by the printer being used. If a character is found in one of the substitute fonts, it is printed in text mode. Otherwise a blank is printed.

The secondary substitute character table is equivalent in structure to the primary substitute character table. TABLE II contains an extract of the secondary substitute character table as implemented in the preferred embodiment:

TABLE II

| secondary_table label | byte |
| --- | --- |
| db 4,1,45,0 | ;char 1,4 is mapped to char 0,45 |
| db 5,1,47,0 | ;char 1,5 is mapped to char 0,47 |
| db 12,1,44,0 | ;char 1,12 is mapped to char 0,44 |
| db 23,1,3,8 | ;char 1,23 is mapped to char 8,3 |
| db 0,2,46,0 | ;char 2,0 is mapped to char 0,46 |

Characters which must be printed in graphics mode are printed using data stored in a Display Resource File ("DRS File"). The DRS File contains data that directs a printer how to print characters of several fonts in graphics mode. When a character is printed in graphics mode, the data for that character is extracted from the DRS File and sent to the printer as described below. Character data is stored in the DRS File in two formats: bitmap (or raster) and vector outline. The format used is dependent upon the output device being used: data in bitmap format is used to display characters on the computer's display screen while vector outline data is used for printers. Printers are generally of three types: PostScript (or vector), non-PostScript (raster or bitmap), and daisy wheel. Both PostScript printers and bitmap printers are capable of printing characters in both text and graphics mode, while daisy wheel printers print only in text mode.

Most printers print in graphics mode by printing individual bits, or dots, on the page in much the same manner as characters are displayed on a raster display screen. A page is broken down into a grid of vertical and horizontal bits. Thus, when a character is printed in graphics mode on a raster printer, the data sent to the printer from the computer is a specific pattern of bits defining the character. The DRS file contains data representing a scalable outline description of the character in which it is defined as a series of small vectors (or line segments) and curves which, when printed, form an outline of the character. Before the data is sent to a raster printer, it must be "rasterized," i.e., converted from vector outline format to bitmap format. Each character printed in graphics mode is rasterized in a "character cell," which is a memory block representing a rectangular grid of coordinates. Locations within the cell are represented by horizontal and a vertical coordinates (the "(x,y)" coordinates). The lower left corner of a character cell may be designated the (0,0) coordinate. The horizontal, or "x", coordinate increases moving right across the cell while the vertical, or "y", coordinate increases moving upward so that in a 10×10 cell the upper right hand coordinate is designated (9,9). A character is defined as a pattern of dots at specified coordinates within the cell. Referring to TABLE III, the bitmapped letter "i" in a 10×10 character cell might contain the pattern of bits shown.

TABLE III

| 0 | 1 | 2 | 3 | 4 | 5 | 6 | 7 | 8 | 9 |
|---|---|---|---|---|---|---|---|---|---|
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |

The rasterized DRS File data for this character would direct the printer to print a dot at locations (3,1), (4,1), (5,1), (4,2), (4,3), (4,4), (4,5), (4,6), (3,6), and (4,8). Since the number of dots used to print actual characters is much greater than in Table I and the size of each dot in the character is extremely small, the actual character's edges will appear smooth.

PostScript (vector) printers print characters by converting the unique outline description of a character into printable raster data. Accordingly, vector outline data consists of a series of (x,y) coordinates and commands for drawing very small curves and line segments that collectively define a character. The scalable outline description of each character is such that it enables the character to be printed at any point size. Thus, the line segments and arcs defining a character can be stretched or shortened depending on the point size of the character being printed. As with bitmap characters, outline-/vector characters are defined relative to a character cell. Vector data for the character "i" in TABLE I, for example, would consist of a series of lines defined within the character cell such that they form the letter "i" when printed together. The vector data format provides a more flexible and efficient manner of storing data, requiring far less storage space for each character, particularly for complex characters.

Figure 3:
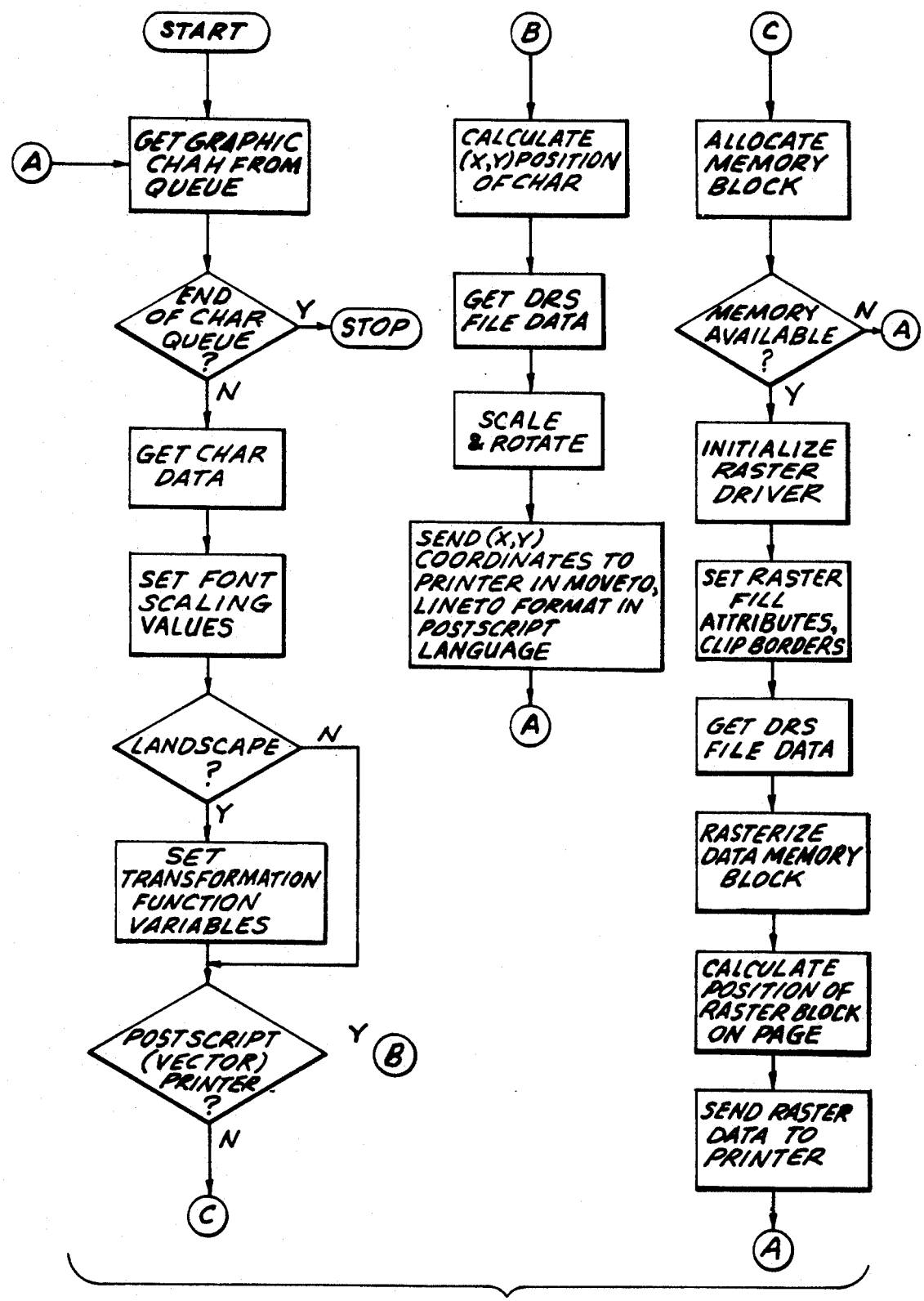
FIG. 3 is a flow chart describing the graphical character printing process.

Referring to FIG. 3, when printing a character in graphics mode, certain known information about the character and its font is first extracted from the PRS File. The character's vertical and horizontal position on the page is calculated based upon its font type, its attributes (e.g., bold, italic, subscript, superscript), its baseline bias (a number used for matching the positioning of baselines of characters and graphic images), and the character cell height. "Font scaling values," which are pre-defined numbers used to scale character data to the selected point size, are then set. If the character is being printed "landscape" (i.e., vertically), then "transformation function" variables are set. A transformation function is functionally equivalent to a transformation matrix which is a well-known mathematical tool for rotating (x,y) coordinates in a grid. For example, if a character needs to be rotated ninety degrees, then a transformation matrix is used to rotate the entire character by way of rotating each (x,y) coordinate defining the character ninety degrees. Since characters are defined in their horizontal position, any character which is not printed horizontally will require rotation of its coordinates before it can be printed.

Referring again to FIG. 3, if the character is being printed on a PostScript printer, the horizontal and vertical position—the (x,y) coordinates—of the character on the page is calculated from text positioning information stored in the character queue. After the character data is read from the DRS file, the character is scaled to the selected point size by adjusting the character data according to the font scaling values so the character is increased or decreased in point size according to the scaling values. The character is also rotated if necessary by using the aforementioned transformation functions. The DRS File data containing the scalable outline description of the character is translated into a known PostScript format recognized by the PostScript printer, called "moveto, lineto format," and then sent to the printer. The PostScript printer then rasterizes the character based on the data and images the rasterized character onto the paper.

Referring to FIG. 3, if a raster printer is being used, a block of memory is allocated with twice the width and one and one half times the height of the character cell block. For example, for a 10×10 character cell, a 300 bit block of memory is allocated (20 bits × 15 bits). Next, several preparatory steps are taken before sending the DRS File character data to the printer. The raster driver, which is the code through which DRS File vector data is converted to raster data to be sent to the printer, is initialized by clearing the memory block (setting it to all "0's") and setting certain parameters that are used in printing the character. These parameters include: the size of the memory block containing the raster data and the dots per inch ("DPI") printed by the printer; the raster "fill attributes" (e.g., for shading characters); and the clip borders (the edges of the memory block outside of which no data can be seen when printed and is therefore clipped). Before being sent to the printer, the DRS file character data is read and rasterized, i.e., converted into a bitmap format within the memory block. This is done by converting the DRS file vector data into a series of (x,y) coordinates which are mapped into bits in the memory block (i.e., bitmapped). For example, the 10×10 character cell in table I would be mapped into a block of memory in which the bits corresponding to the (x,y) coordinates where a dot is to be printed are set to a value of "1" and the rest remain set to "0". A dot is printed in each character cell location corresponding to a "1" bit in the memory block. Thus, the memory block is said to be a "bitmap" containing a one-to-one correspondence between the bits in the memory block and the dots comprising the character on the printed page. The exact location on the page where the graphic image contained in the memory block is to be printed is then determined and the data is sent to the printer to be printed. This process is repeated for each graphic character printed in the document.

Thus, the disclosed method and apparatus enables wordprocessor users to create and print documents with many combinations of fonts, character styles, and character sizes that, before the invention, could not be so combined in a single document and printed on a single printer. While the description of the invention contained herein is lengthy, the invention, when implemented, for example, on an IBM PC or compatible computer having a 25 MHz Intel 80286 microprocessor and at least 384K RAM, can process each iteration of the disclosed invention in several milliseconds.

We claim:

1. A computer system for performing wordprocessing operations, the computer system comprising:
   (a) input means responsive to operator commands enabling an operator to specify any of a plurality of characters for inclusion in a document being created or edited;
   (b) printing means having the capability of printing characters in either text or graphics mode;
   (c) memory means associated with the printing means for storing a text mode definition for each of a subset of the plurality of characters that may be specified by the operator using the input means;
   (d) a first data storage means identifying each character having a text mode definition in the memory means;
   (e) processing means coupled to the input means, the first data storage means and the printing means for comparing each character selected by the operator with information stored in the first data storage means to determine whether, for each specified character, a text mode definition exists in the memory means and,
      (i) if said definition exists, sending data to the printing means identifying the character; or
      (ii) if said definition does not exist, taking alternative action comprising sending data identifying an alternative character to the printing means for printing in graphics mode or sending data identifying said alternative character in a substitute font to the printing means for printing in text mode.

2. The computer system of claim 1 further including a second data storage means containing data identifying at least one substitute character for at least one of the plurality of characters selected by the operator in the same font for which a text mode definition exists in the memory means, and in which the alternative action includes sending data from the second data storage means identifying the substitute character to the printing means for printing in text mode.

3. The computer system of claim 1 further including a third data storage means containing data identifying at least one substitute character for at least one of the plurality of characters selected by the operator in a font for which a text mode definition exists in the memory means, and in which the alternative action includes sending data from the third data storage means identifying the substitute character to the printing means for printing in text mode.

4. The system of claim 1 wherein said graphics mode printing includes
   (a) if said printer is a vector printer, converting said data to a vector outline format recognized by said printer and sending said data to said printer; or
   (b) if said printer is a bitmap printer, converting said data to bitmap data and sending said data to said printer.

5. A method for printing characters in a computer system including input means responsive to operator commands enabling an operator to specify any of a plurality of characters for inclusion in a document being created or edited, printing means having the capability of printing characters in either text or graphic mode, memory means associated with the printing means for storing a text mode definition for each of a subset of the plurality of characters that may be specified by the operator using the input means, a printer resource file identifying each character having a text mode definition in the memory means, processing means coupled to the input means, the printer resource file and the printing means for comparing each character selected by the operator with information stored in the printer resource file to determine whether, for each specified character, a text mode definition exists in the memory means and,
   (i) if said definition exists, sending data to the printing means identifying the character; or
   (ii) if said definition does not exist, taking alternative action comprising sending data identifying an alternative character to the printing means for printing in graphics mode or determining that a substitute font has been selected, changing to said substitute font, and printing said character in said substitute font.

6. The method of claim 5 further comprising the step of determining that a substitute character exists in a primary substitute character table and printing said substitute character in place of said character.

7. The method of claim 6 further including the step of determining that said character or said substitute character cannot be printed in text mode and printing said character in graphics mode.

8. The method of claim 5 further comprising the step of determining that a secondary substitute character exists in a second substitute character table and printing said secondary substitute character in text mode.

9. A method for printing a document having characters of one or more fonts on a single printer in either text mode or graphics mode, for each character in said document said method comprising the steps of:
   (a) determining whether said character can be printed in text mode and printing said character in text mode if said character can be printed in text mode; or
   (b) determining whether said character can be split into separate characters, a base character and a diacritical character, if said entire character cannot be printed in text mode; and
      (1) printing said base character and said diacritical in text mode overstruck one upon the other if said character can be split into a base and a diacritical and both said base character and said diacritical can be printed in text mode; or
      (2) printing said base character in text mode and said diacritical in graphics mode overstruck one upon the other if said character can be split into a base character and a diacritical and said base character can be printed in text mode on said printer but said diacritical cannot be printed in text mode; or
   (c) determining whether a list of substitute fonts has been specified for said character's font and replacing said character with the same character in a substitute font and repeating steps (a) and (b) for said substitute character if said list has been specified for said character's font; or
   (d) if a similar character in said character's font or said list of substitute fonts exists, repeating steps (a) and (b) for said similar character; or
   (e) printing said character in graphics mode on said printer if said character has not been printed using steps (a) through (d).

* * * * *